(12) United States Patent
Bardsley et al.

(10) Patent No.: US 7,818,580 B2
(45) Date of Patent: Oct. 19, 2010

(54) CONTROL OF PORT BASED AUTHENTICATION PROTOCOLS AND PROCESS TO SUPPORT TRANSFER OF CONNECTION INFORMATION

(75) Inventors: Jeffrey Scott Bardsley, Durham, NC (US); Nathaniel Wook Kim, Raleigh, NC (US); Charles Steven Lingafelt, Durham, NC (US); Allen Leonid Roginsky, Durham, NC (US); Norman Clark Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1418 days.

(21) Appl. No.: 11/200,762

(22) Filed: Aug. 9, 2005

(65) Prior Publication Data

US 2007/0038866 A1 Feb. 15, 2007

(51) Int. Cl.
G06F 21/00 (2006.01)
(52) U.S. Cl. ............... 713/182; 713/170; 713/169; 713/155; 708/135; 726/2; 726/13
(58) Field of Classification Search ............... 713/182, 713/155; 379/93.01; 708/133; 726/1–36
See application file for complete search history.

(56) References Cited

U.S. PATENT DOCUMENTS

| | | | | |
|---|---|---|---|---|
| 5,842,043 | A * | 11/1998 | Nishimura | 710/36 |
| 5,848,244 | A * | 12/1998 | Wilson | 709/221 |
| 6,092,063 | A * | 7/2000 | Cheng et al. | 707/2 |
| 6,092,196 | A | 7/2000 | Reiche | 713/200 |
| 6,223,289 | B1 * | 4/2001 | Wall et al. | 726/16 |
| 6,615,264 | B1 * | 9/2003 | Stoltz et al. | 709/227 |
| 6,728,884 | B1 | 4/2004 | Lim | 713/201 |
| 6,772,331 | B1 * | 8/2004 | Hind et al. | 713/151 |
| 6,859,527 | B1 * | 2/2005 | Banks et al. | 379/106.03 |
| 6,865,680 | B1 * | 3/2005 | Wu et al. | 726/12 |
| 6,981,035 | B1 * | 12/2005 | Goldberg et al. | 709/223 |
| 6,990,587 | B2 * | 1/2006 | Willins et al. | 713/182 |
| 7,042,988 | B2 * | 5/2006 | Juitt et al. | 379/88.17 |
| 7,356,838 | B2 * | 4/2008 | Madison et al. | 726/10 |
| 2001/0029534 | A1 * | 10/2001 | Spinks et al. | 709/224 |
| 2003/0084275 | A1 | 5/2003 | David et al. | 713/1 |
| 2003/0087629 | A1 * | 5/2003 | Juitt et al. | 455/411 |
| 2005/0169288 | A1 * | 8/2005 | Kamiwada et al. | 370/401 |
| 2005/0171836 | A1 * | 8/2005 | Leacy | 705/14 |
| 2005/0216770 | A1 * | 9/2005 | Rowett et al. | 713/201 |
| 2006/0010484 | A1 * | 1/2006 | Fujino | 726/3 |
| 2007/0022133 | A1 * | 1/2007 | Barghouthi | 707/102 |

FOREIGN PATENT DOCUMENTS

CN 1503519 A 6/2004

* cited by examiner

*Primary Examiner*—Farid Homayounmehr
(74) *Attorney, Agent, or Firm*—Arthur Samodovitz; Law Office of Jim Boice (57) ABSTRACT

Method, system, and program product for port based authentication protocols where addresses are dynamically assigned within a network environment, and more particularly to port based authentication in the network environment, where connection information is captured and stored. This facilitates administrator access to information created as a result of protocol exchanges involved in dynamic address assignment, authentication, and connection.

20 Claims, 8 Drawing Sheets

| Switch Port | Central Site Address | Authentication Server ID | MAC Address(es) | IP Address(1) | Time stamp(1) | IP Address(2) | Time stamp (2) | ........ |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |
| ........ | | | | | | | | |

CONTROL OF PORT BASED AUTHENTICATION PROTOCOLS AND PROCESS TO SUPPORT TRANSFER OF CONNECTION INFORMATION

BACKGROUND

1. Field of the Invention

The invention relates to dynamically assigned addresses in a wire or wireless network environment, and more particularly to port based authentication in the network environment, and to administrator access to information created as a result of protocol exchanges involved in dynamic address assignment, authentication, and connection.

2. Background Art

The 802.1X standard is designed to enhance the security of wireless local area networks (WLANs) that follow the IEEE 802.11 standard. 802.1X provides an authentication framework for wireless LANs, allowing a user to be authenticated by a central authority. The actual algorithm that is used to determine whether a user is authentic is left open by the standard and multiple algorithms are possible.

802.1X uses an existing protocol, the Extensible Authentication Protocol (EAP, RFC 2284), that works on Ethernet, Token Ring, or wireless LANs, for message exchange during the authentication process.

In a wired or wireless LAN with 802.1X, a user (known as the supplicant) requests access to an access point (known as the authenticator). The access point forces the user (more precisely, the user's client software) into an unauthorized state that allows the client to send only an EAP start message. The access point returns an EAP message requesting the user's identity. The client returns the identity, which is then forwarded by the access point to the authentication server, which uses an algorithm to authenticate the user and then returns an "accept" or "reject" message back to the access point. Assuming an "accept" was received, the access point changes the client's state to authorized and normal traffic can now take place.

The authentication server may use the Remote Authentication Dial-In User Service (RADIUS), although 802.1X does not specify the tools or applications used by the authentication server.

As described above, in current connection protocols, such as 802.1X, the supplicant's (user's) MAC address (Media Access Control address), user ID, and user's unique secret, such as password and digital certificate, are supplied to an authentication server. The authentication server validates the user and returns a message to the switch indicating if the user is or should be connected to the network. One problem is that the user supplied information is not available to the server.

The user supplied information includes:
1) Authenticator information, such as the switch or wireless access point identification;
2) Physical authenticator (i.e., switch) port number;
3) MAC address or addresses of systems attached to the port.
4) IP addresses of systems attached to the port.
5) Authentication server identification.
6) Other administrator defined information about the authenticator, such as switch, or wireless access point.

Network administrators need access to the information created and exchanged as part of the authentication process with respect to a particular user attached to a particular authentication port. This information is needed for effective network administration, as well as for trouble resolution procedures.

One problem is that current standards, such as 802.1X, do not provide a method that can be used to obtain this information from the authenticator. Moreover there is no effective way that current protocols can provide this information.

These problems arise because Protocol 802.1X is a port based authentication protocol and not a database management system or protocol. That is, 802.1X is limited to identification and authentication of a device at an authenticator, for example a switch port.

Figure 1:
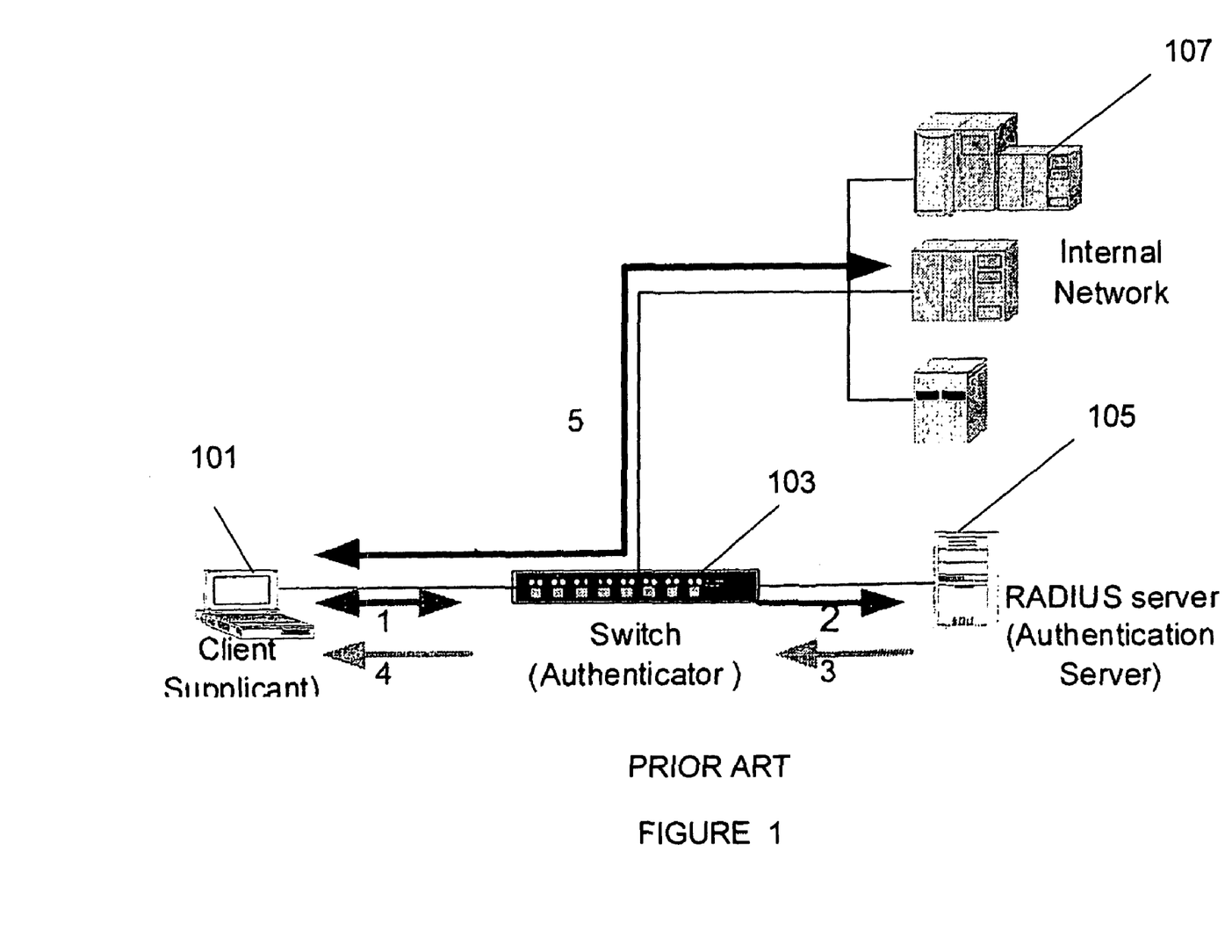
FIG. 1 is an illustration of a network of the prior art having a client (supplicant), a Radius authentication server, a switch, and an internal network to which access is sought.

FIG. 1 illustrates a typical network of the prior art using the 802.1X protocol to authenticate a device 101 upon insertion a network. As shown in FIG. 1, in a Local Area Network where 802.1X is enabled, the authenticator (switch) 103 challenges the client 101, step 1, for its identity. This is to validate that the user is authorized access to the network. The client 101 responds, 1, and the authenticator 103 sends the supplied supplicant's identity 2 to an authentication server 105, such as a Remote Authentication Dial-In User Service ("RADIUS") server, for actual authentication, 3, of the client.

The authentication server 105 responds 3 to the authenticator 103 with a response. If the client 101 is authorized, the switch 103 puts the client's port in "authenticated" and forwarding state. The switch 103 relays the authentication result 4 to the client 101. Once the client is authenticated and the port is in the authorized state, the client 101 can access 5 the network and network resources 107.

If, however, the authentication is not successful, the switch 103 keeps the port closed and no traffic can go through the port.

One shortcoming of the prior art system is that is that current standards, such as 802.1X, do not provide a method that can be used to obtain information for network management and asset management from the authenticator 103 as authenticator information, switch or wireless access port, physical authenticator port number, MAC address, IP address, and authentication server, as well as time stamps.

SUMMARY OF THE INVENTION

The deficiencies and shortcomings of the prior art are obviated by the method, system, and program product described herein. As described herein, the method, system, and program product capture and transfer the supplicant (client) information that is observed in the authenticator to a central site, that is, an administrator site. This information is the information that was primarily created during the protocol exchanges. The information is stored in one or more databases or augmented databases. This information, typically includes owner to IP address correlation, the MAC, IP, Port Switch Number, Switch ID, and Authentication Server ID.

In a preferred embodiment the transferred or collected information can be used for malware mitigation, vulnerability scanning, usage based billing, and asset management.

These results are obtained by integrating data acquisition, data storage, and database management functionality with the authenticator function.

DETAILED DESCRIPTION OF THE INVENTION

The method, system, and program product facilitates the acquisition, storage, and subsequent utilization of the connection data in a network, such as a wire or wireless network. The method, system, and program product provide complete layer 2 and 3 information concerning authenticated port users to a central point. The central point may be an authenticator switch, an authentication server, or server associated to an internal network.

In a further embodiment, the invention further provides an association of a connected device's IP address to its MAC address. This avoids the cost and complexity associated with creating a separate MAC to IP registration database system that must then be linked with DHCP systems for dynamic assignment of IP addresses.

The method, system, and program product described herein may report changes in switch status, e.g., periodically or on demand or on the happening of events, such as the disconnection of a port.

Moreover, the method, system, and program product described herein may be such as to facilitate the action of the switch in observing and sending additional information to a central site. This includes port status, port speed, packets per second statistics, etc.

Figure 5:
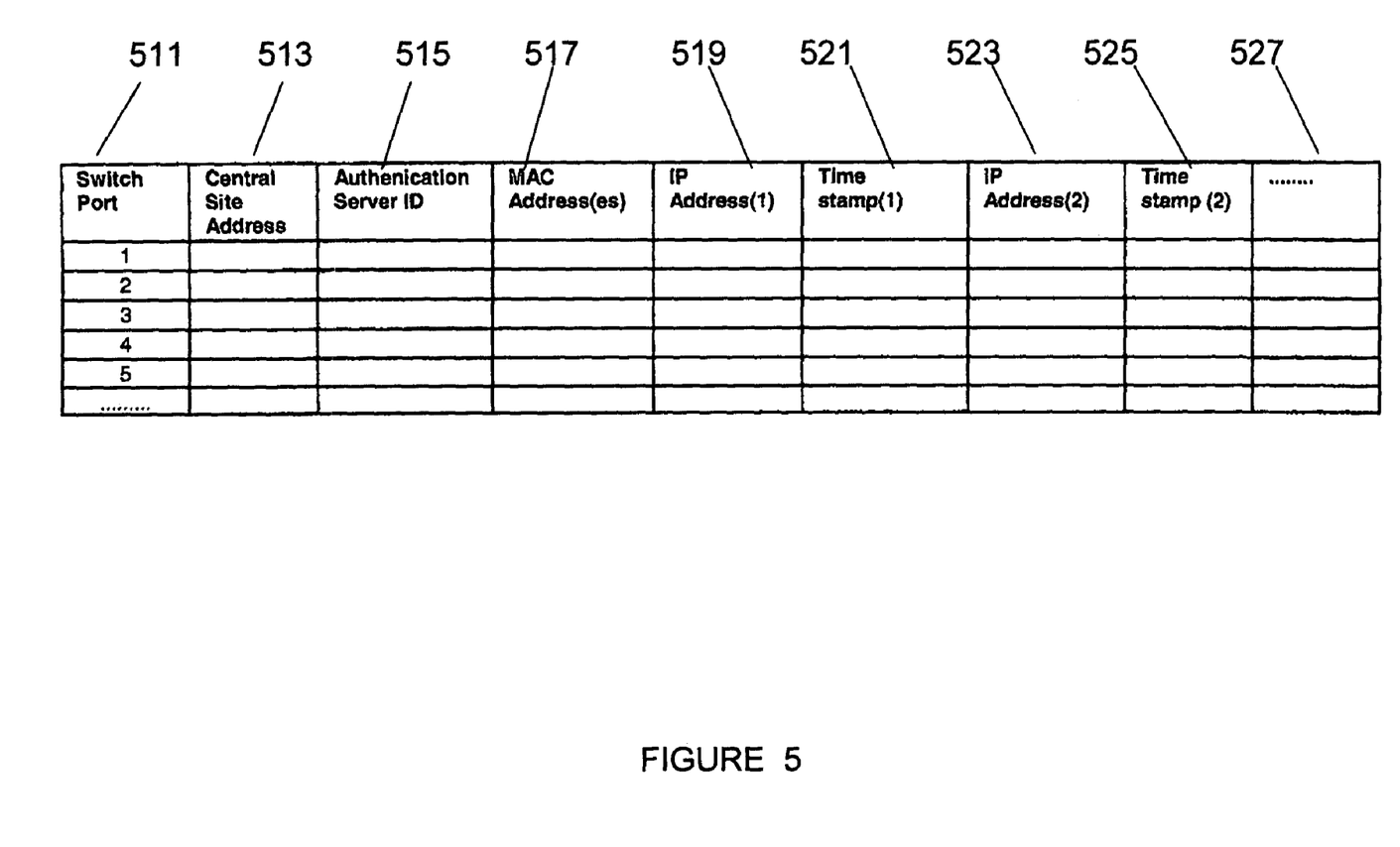
FIG. 5 illustrates a "Communications Table" data structure provided in or across the central site.
Figure 8:
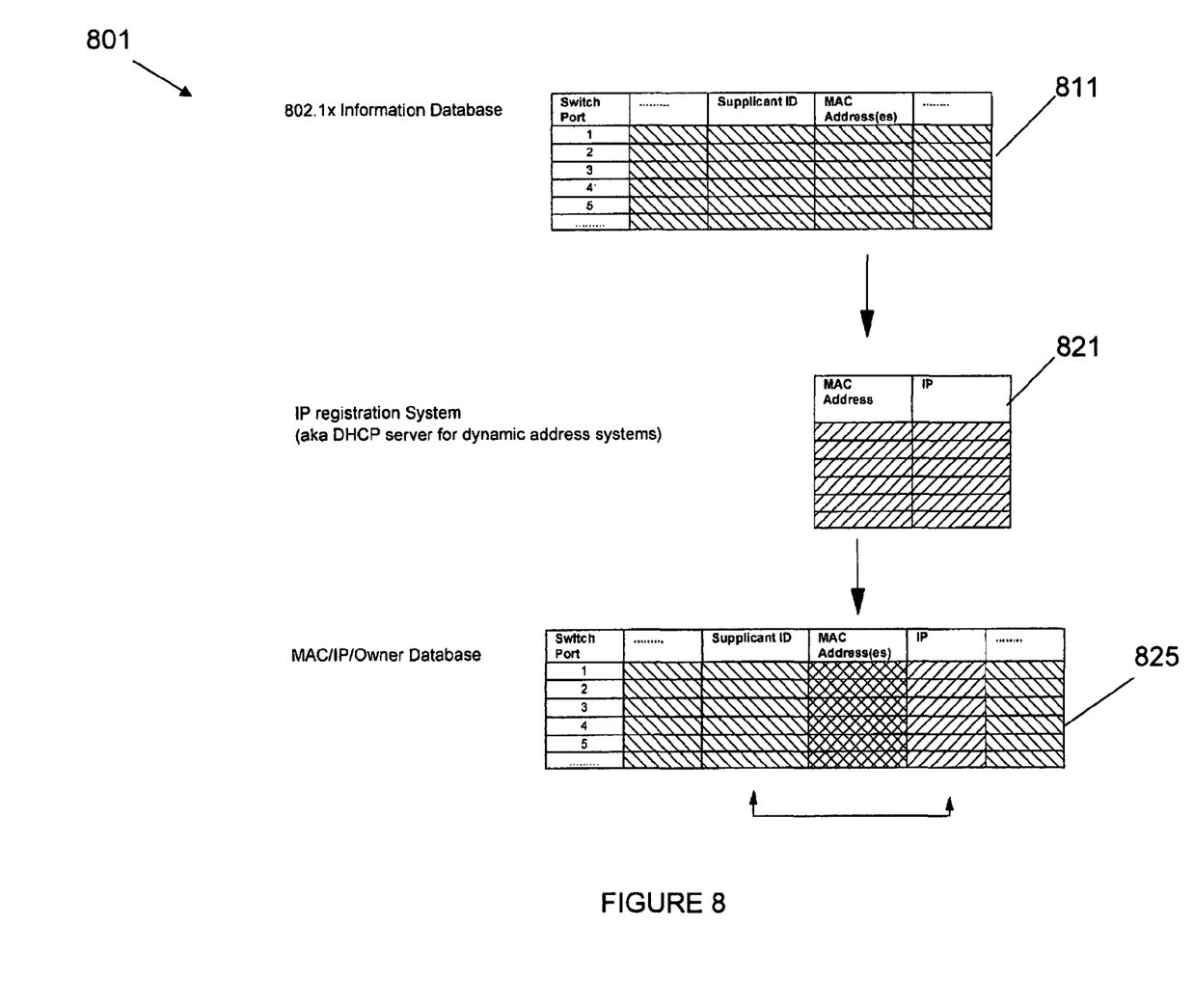
FIG. 8 illustrates the flow of information within the database illustrated in FIG. 7.

It is to be noted that the information contained in the Communications Table of FIGS. 5 and 8 may be made available in an SNMP MIB for retrieval using SNMB procedures. Also, the information contained in the Communications Tables of FIGS. 5 and 8 can be sent to RADIUS or TACACS authentication servers 105 or a server 209 on the network. These servers would always have a copy of the information for the switches within their span of control, optionally a central station that could pull information from the authentication servers.

Figure 2:
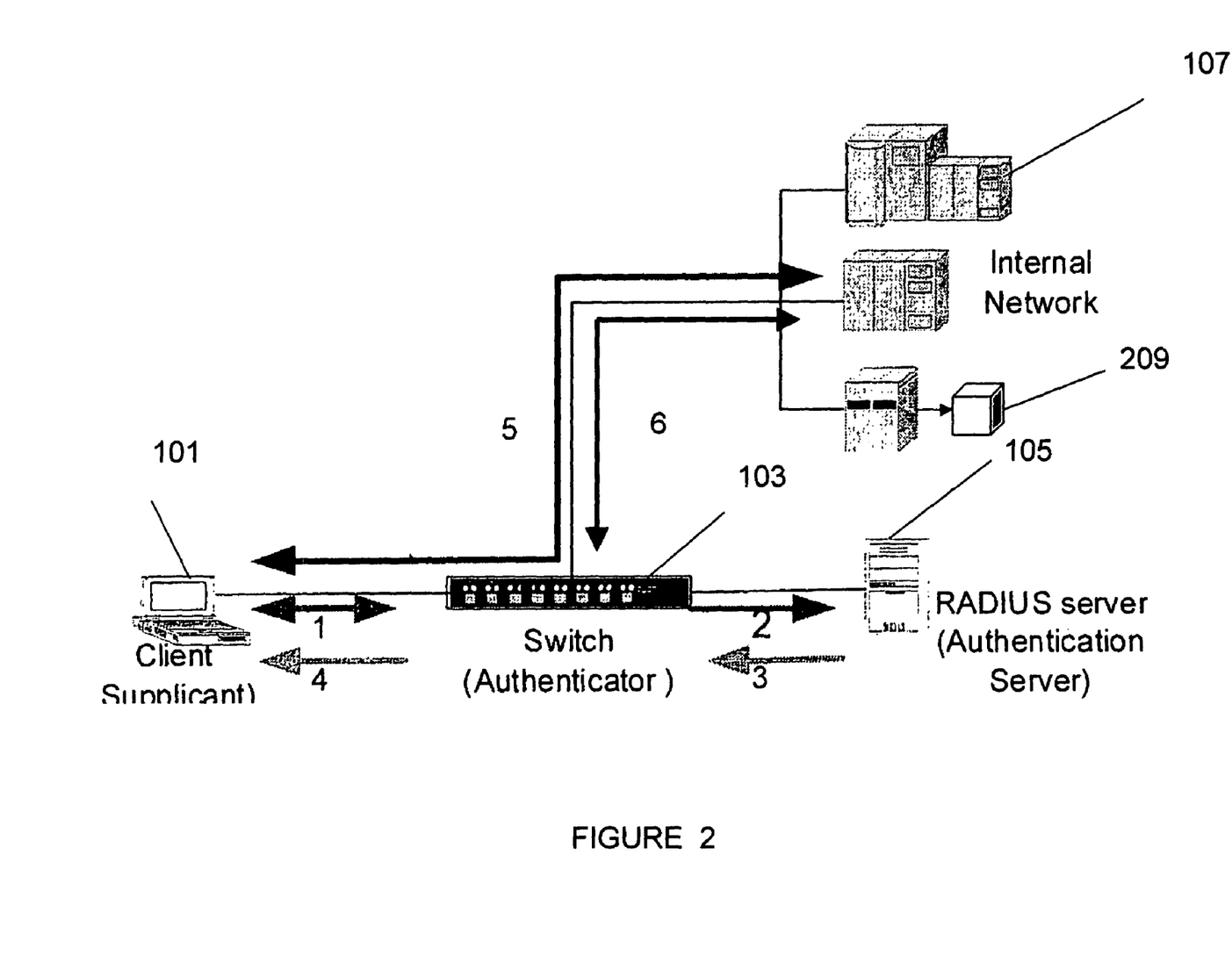
FIG. 2 is an illustration of a network of the invention having a client (supplicant), a Radius authentication server, a switch, and an internal network to which access is sought, and a central site, as an administrative site, which may include data servers and database management system servers.

FIG. 2 illustrates a network as contemplated by our invention using the 802.1X protocol to authenticate a device 101 upon insertion a network. As shown in FIG. 1, illustrating the prior art, and in FIG. 2, illustrating one embodiment of our invention, in a Local Area Network where 802.1X is enabled, the authenticator (switch) 103 challenges the client 101, step 1, for its identity. This is to validate that the user is authorized access to the network. The client 101 responds, 1, and the authenticator 103 sends the supplied supplicant's identity 2 to an authentication server 105, such as a Remote Authentication Dial-In User Service ("RADIUS") server, for actual authentication, 3, of the client. The authentication server 105 responds 3 to the authenticator 103 with a response. If the client 101 is authorized, the switch 103 puts the client's port in "authenticated" and forwarding state. The switch 103 relays the authentication result 4 to the client 101 and to the internal network 107 optionally including an authentication database 209, in flow 6. Once the client 101 is authenticated and the port is in the authorized state, the client 101 can access the network and network resources 107, and the administrator, not shown, can make use of the authentication and connection data in database 209.

If, however, the authentication is not successful, the switch 103 keeps the port closed and no traffic can go through the port.

Figure 3:
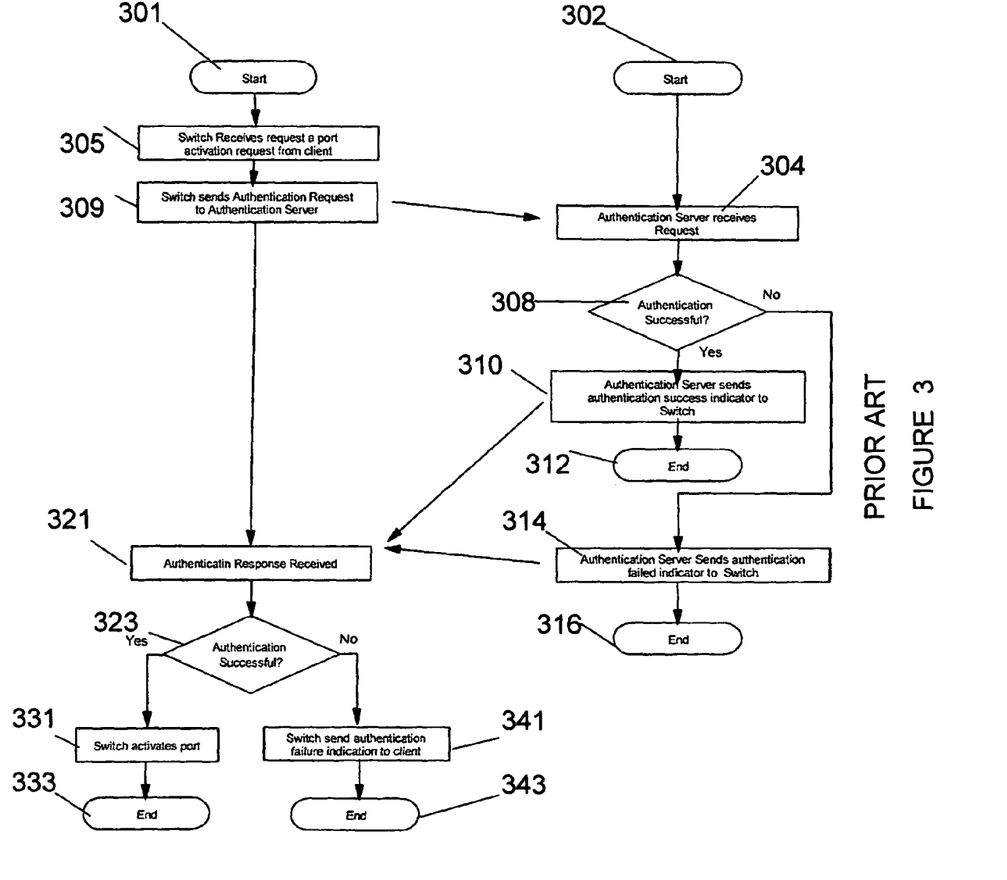
FIG. 3 illustrates the protocol flow of the prior art and specifically shows that there is no data flow between a central server or site and the authenticator.

FIG. 3 illustrates the protocol flow of the prior art and specifically shows that there is no data flow between a central server 107 or site and the authenticator 103. This chart illustrates the process of authenticating a connected user.

As shown in FIG. 3, there are two parallel paths, the first path, on the left, with odd numbers, beginning at "Start" 301 shows the activities at switch 103, and the second path, on the right, with even numbers, beginning at "Start" 302 shows the activities at the authentication server 105.

At the switch 103, the process starts 301, when the switch 103 receives a port activation request 305 from the client 101. The switch 103 sends the activation request to the authentication server 105. The authentication server 105, having been started 302 receives the request and determines if authentication is successful 308. If the successful 310 the authentication server 105 sends an authentication success indicator back to the authentication switch 103 at step 310 and ends 312. If the authentication process at the authentication server was unsuccessful the authentication server 105 sends an authentication failed indicator 314 to the authentication switch 103 and the process ends 316.

The response, either of successful authentication 310 or authentication failure 314, is received at the authentication switch 321, and decoded 323. If successful the authentication switch 103 activates the port 331. If, however, the authentication at the authentication server 105 was unsuccessful 314, the authentication switch sends an authentication failure indication back to the client 101 in step 341 and closes the switch port.

In the Prior Art, as illustrated in FIG. 3, there is no capture and storage of user ID, wall plate number of wireless node number, or MAC address. Any capture and storage of user data is at individual applications at the internal network 107, and relates to the usual security, access, and privilege concerns of the individual hosts and host based processes, and has nothing to do with network access or usage. The host based processes in internal network 107 have no interest in or concern with network attachment, or network user login data.

However, the network administrator does have an interest in and a need for and concern with network attachment, and network user login data. The method, system, and program product described herein captures network user (supplicant or client) network attachment and user login data. This is illustrated in the flow chart of FIG. 4 which illustrates added functionality and capability according to our invention which synergistically augments the method and system shown in the flow chart of FIG. 3.

Figure 4:
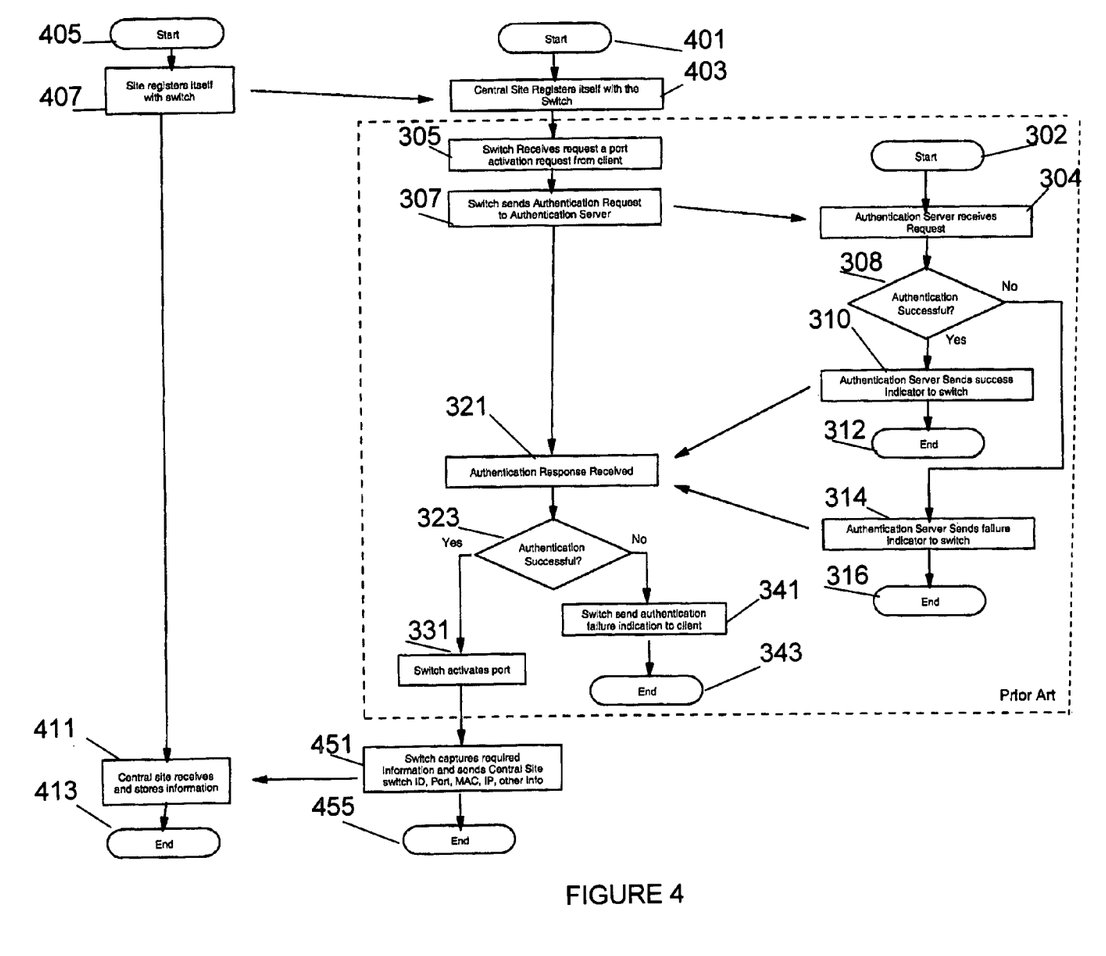
FIG. 4 illustrates the protocol flow of the invention described herein and specifically shows that there is a substantial amount of data flow between a central server or site and the authenticator.

The processes start at the central site's "start" 405 and the authentication switch's "start" 401. The central site 209 starts 405 and registers itself (403 in the authentication switch process flow, 407 in the central switch process flow) with switch 103. The process continues as in FIG. 3 until the authentication switch 103 activates 331 the port 101. At this point the switch 103 captures the required information 451.

This required information includes the central site ID, port ID, user ID, MAC address, etc. The switch 103 sends this captured information to the central site 209, which captures, receives, and stores the information 411, and the process ends 413.

FIG. 4 illustrates the flow chart of the augmented and integrated method and system of the invention. Comparing FIG. 3 and FIG. 4, FIG. 4 illustrates the extensions to the prior art protocol and process flow illustrated in the flow chart of FIG. 3

The central site 107, while illustrated as a single unit, could be embodied in various ways, and even as a distributed system.

FIG. 5 illustrates a "Communications Table" database metadata and architecture provided in or across the central site 107, for example in a server 209.

Turning first to the table of FIG. 5, each switch port has a row 511. Identified to each switch port is a central site address 513, an authentication server ID 515, MAC addresses 517, IP addresses 519, and a time stamp 521. For each port, information is captured and stored by the authenticator switch 103 during operation of the protocol and its processes.

In the table of FIG. 5, the column "Central Site Address" 513 denotes the logical address of the registered central site that wishes to obtain information with respect to the port. Multiple notifications can be registered and made.

"Authentication Server ID" 515 identifies the Authentication Server 105 that was used as the authorization source for that port's authentication. MAC Address(es) 517 denote the MAC Addresses that are authorized to use this port.

IP Address 519 and Time Stamp 521 are logically paired fields and represent the time that an IP address whose source was from the identified port was observed. It is to be noted that there can be more then one IP Address-Time Stamp pair per port. These are shown in columns 523 and 525. This is denoted in the column "IP Address." The table is scalable and extensible and additional columns 527 can be added as defined by the needs of the network administrator.

Figure 6:
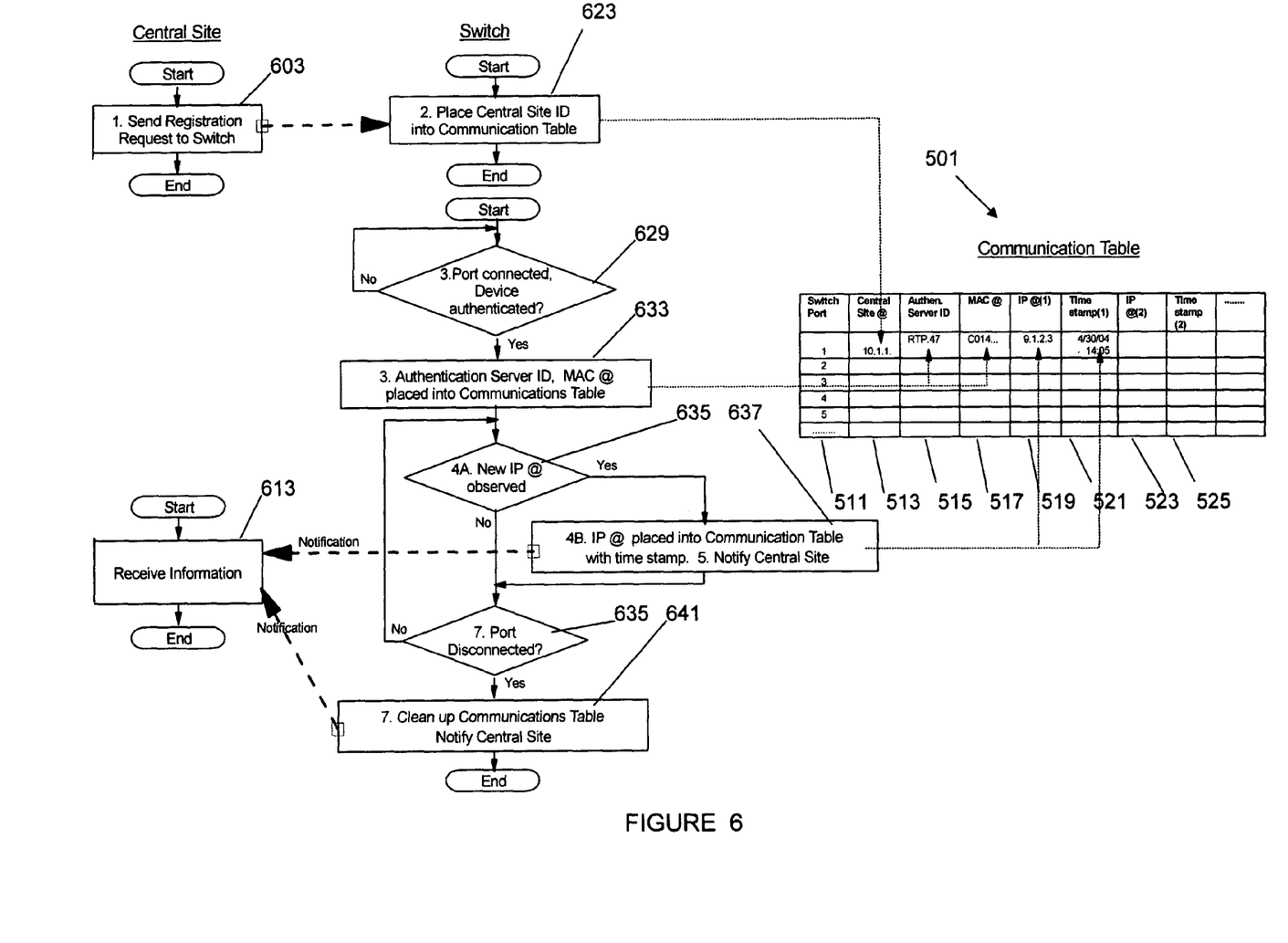
FIG. 6 illustrates a flow chart of the method of the invention with data flow between the authenticator and the central site, and storage of information in an associated database.

FIG. 6 illustrates a flow chart of the method of the invention with data flow between the authenticator and the central site. As shown in FIG. 6, when a port state changes, the switch sends this information to the central site. The invention described herein is the set of actions to and through the switch associated with processing the registration request. We refer to this as "Registration and Reporting."

Turning to FIG. 6, it is seen that the switch 103 of FIG. 2 performs the following steps for "Registration":

The central site/authentication server 105, starting at 601, sends a registration request 603 to switch 103. Switch 103, having been started 621 receives the registration request with designation of which port or ports to observe and places the authentication server 105 ID 513, or a pointer to the ID, into the communications table in the column corresponding to the switch port 511 to be observed.

The invention described herein is independent of the communications path between the switch 103, the authentication server 105, and the central site 209. The path could be a simple UDP frame, a TCP session, or an SNMP flow in which an SNMP set can be used to place the "address of the central site 209 into the switch 103, and SNMP alerts or reads can be used to move the information back and forth between the switch 103 and the central side/authentication server 105.

Thereafter, the switch 103 performs the following functions for "Reporting" as shown in FIG. 6: First, at the conclusion of the protocol exchange, the switch 103 the switch determines if the port is connected 629, and if so, 633 places the following information in the communications table 501:

i) Authentication server ID 515
  ii) MAC addresses 517 of supplicants with table key of switch Port ID 511.

Next, the switch 103 observes the source address of the IP packets flowing through the switch 103 at 635 and places the IP address 519 and time stamp 521 into the communications table 501 at 637 with the table key of the switch port ID.

If the IP address changes and the "Central Site" 209 has indicated a desire for the information, the record for that port is sent to the "Central Site" 209 at 613.

The switch has the capability of aging out IP addresses based on their time stamp entry.

When a port becomes inactive, the values keyed to that port for the Authentication Server ID, MAC Address(es), etc. are cleared. 641. If the "Central Site" 209 has requested the information, it is sent to the "Central Site" 209 at 613.

The step of authenticator switch 103 observing the source address of the IP packets flowing through the switch may be accomplished by monitoring the port packet flow for source IP addresses. Alternatively, the authenticator switch 103 observing the source address of the IP packets flowing through the switch may be accomplished by observing layer 3 and layer 2 traffic containing information about the supplicant. This includes ARP traffic, DHCP flows, and the like.

In still a further embodiment of the invention, switch 103 observes the source address of the IP packets flowing through the switch by the supplicant client change sending a packet to the authenticator with the supplicant's IP address.

The invention may be implemented in one or more of extensions of the method, system, and program product of the invention integrated into existing software, especially for switches built using microprocessor technology. Additionally or alternatively the network processor may be programmed and use hardware assists. In a still further embodiment the necessary code may be hardwired into FPGA or ASIC modules.

In a particularly preferred exemplification of our invention, the registration and authentication information in the database table (as shown, for example, in FIG. 5 may be augmented to provide owner to IP address information, as well as further information.

Figure 7:
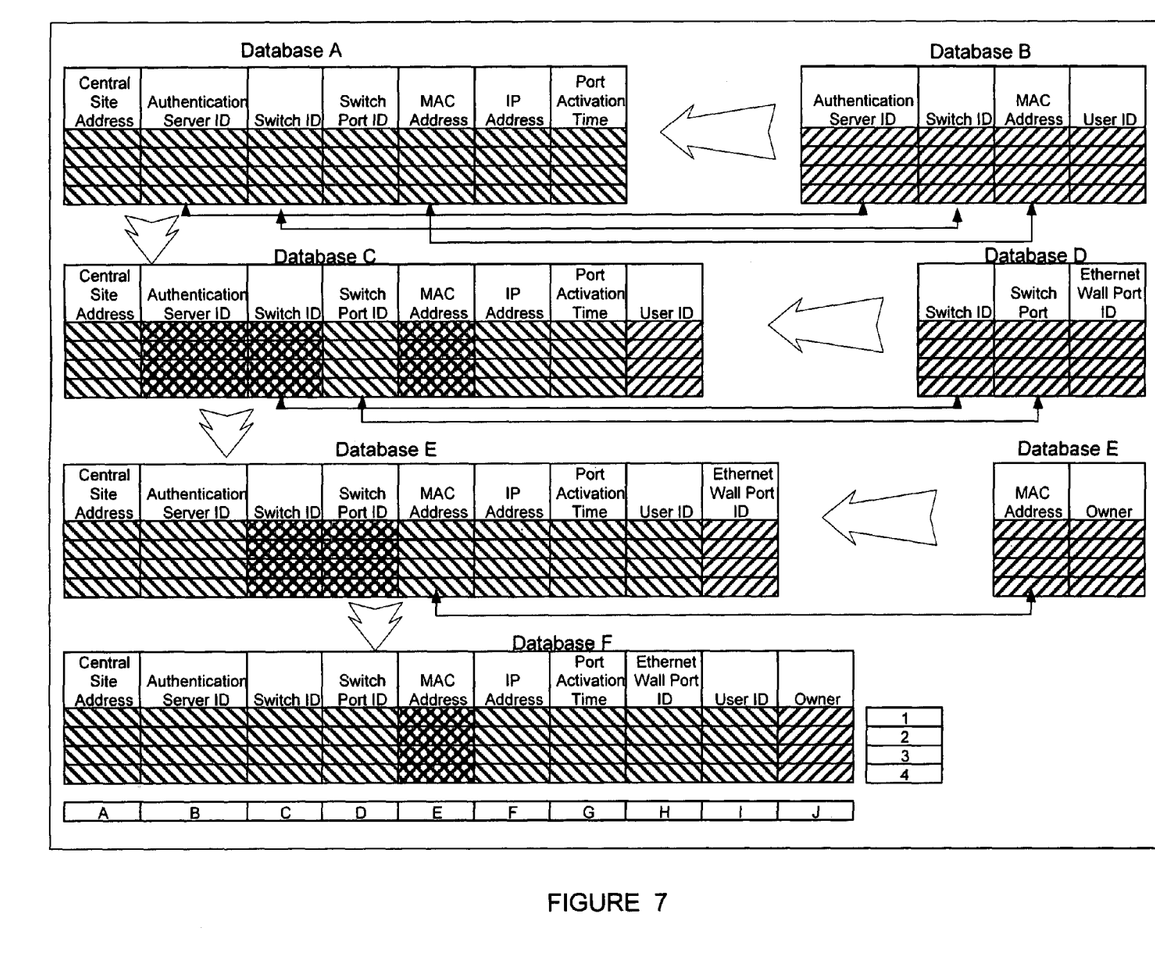
FIG. 7 illustrates the construction of an augmented database. The database includes central site address, authentication server ID, switch ID, switch port ID, MAC address, IP address, Port activation time, Ethernet wall port, user ID, and owner.

FIG. 7 illustrates an augmented database according to this embodiment of the invention. The database includes columns for central site address, authentication server ID, switch ID, switch port ID, MAC address, IP address, and Port activation time, of "Database A" and authentication server ID, switch ID, MAC address, and User ID of "Database B" merging to form "Database C" with central site address, authentication server ID, switch ID, switch port ID, MAC address, IP address, Port activation time and User ID. Next "Database D" with Switch ID, Switch Port, and Ethernet Port ID merges with "Database C" to form "Database E." "Database E" contains central site address, authentication server ID, switch ID, switch port ID, MAC address, IP address, Port activation time, User ID and Ethernet Wall Port ID. MAC Address and Owner are then merged with "Database E" to form "Database F" which now contains central site address, authentication server ID, switch ID, switch port ID, MAC address, IP address, Port activation time, User ID, Ethernet Wall Port ID, and Owner. The database is extensible and expandable.

This additional information may be used for malware mitigation, for vulnerability scanning, for usage based billing, for system forensics and incident response, and for asset management. Specifically, the information derived from registration and reporting can be associated with MAC/Owner information and Switch port/Wall plate information, which we refer to as merged data, may be used to provide an association between an IP address, for example, a dynamic IP address, observed on the network and an owner, along with physical location. This added information can then be used to support malware mitigation, vulnerability scanning, usage based billing, computer forensics and incident response, and asset management.

For example, the merged or associated data facilitates identification of networked devices, association of the identified devices to their owners, and the physical locations of the networked devices, especially networked devices that have been infected with malware.

Moreover, the merged or associated data facilitates identification of networked devices, association of the identified devices to their owners, and, optionally, the physical locations of the networked devices, to identify access location and time.

Additionally, the merged or associated data facilitates identification of dynamically IP addressed networked devices and association of the identified devices to their owners.

A further utility of the merged or associated data is the facilitation of identification of dynamically IP addressed networked devices, and association of the identified devices to their owners for billing based on network access time and bandwidth usage.

A still further utility of the merged or associated data is that it facilitates identification of protocol compliant devices that are attached to the network, and the current location of network devices for asset management.

Building upon the authenticator switch 103 observing when a device becomes active on a switch port and sending the information, e.g., MAC addresses, IP addresses, associated switch port identity, and time of network connection, to a central repository 209, e.g., registration and recording, a correlation database is formed. In one exemplification, a database of a set of ordered pairs of MAC address and Owner is formed for every device on the network. This database or database field, which could be a MAC Registration Database, formed for every device on the network, could be equivalently formed by a web interface or by mining existing databases.

This data field or database is merged or associated with the protocol information to yield a MAC-IP-Owner association in a MAC-IP-Owner database. This is done using the ID presented by the supplicant.

Specifically, in a preferred embodiment the switch observes when a device becomes active, and sends the information to a central repository, such as a database. The data base has the data necessary to a form a correlation between MAC addresses and owners. This provides valuable data and information for malware mitigation, vulnerability scanning, usage based billing, forensics, and asset management.

Various queries may be constructed and used with the database. Exemplary are Base, Malware, Forensics, Scanning, Billing, and Asset Management.

Database uses information derived from the operation of Protocol 802.1X and merging that information with a MAC/Owner Information Database and a Switch port/Wall plate Information Database to create a new database or a database field with an association between an IP address, e.g., a dynamic IP address, observed on the network and an owner along with a physical location of the end device. This can be used to support malware mitigation, vulnerability scanning, usage based billing, computer forensics and incident response, and asset management.

Malware uses the merged database to identify owners of a networked device and physically locate the devices that have been infected with malware.

Forensics uses the merged database to identify network device users/owners and track network access location and time.

Scanning uses the merged database to identify owners of dynamically addressed IP devices that are scanned based on IP address.

Billing uses the merged database to identify owners of dynamically IP addresses devices and bill them based on network access time and bandwidth usage.

Asset_Management uses the merged database to identify, e.g., 802.1x compliant, or other protocol compliant, devices that are attached to the network, their owners, and current physical location of the devices for the purpose of asset management.

According to our invention, a switch or other device observes when a device becomes active on a switch port, e.g., a physical switch port, and sends this information to a central repository. This information includes MAC addresses, IP addresses, and the associated switch port identity and the time of network connection. This collection of information is used as the root source for information upon which to base services.

FIGS. 6 and 7 illustrate the merging of the individual databases or database column entries to form the database. Specifically, as shown in FIG. 6, the method and system of our invention forms a correlation database. This is done by forming an ordered pair of MAC address and Owner for every device attached to the network. This is called the MAC Registration Database. This can be done using a web interface that a user accesses to create the MAC to owner association. Alternatively, it may be done by mining existing databases.

Next, as is also shown in FIG. 6, the MAC address and the ordered pair information from the MAC registration are merged with the Protocol 802.1X information. This yields a MAC-IP-Owner database or database entry. FIG. 7 illustrates the merging of the individual databases or database column entries to form the database.

As described generally, the MAC-IP-Owner database or database entry can then be used to facilitate malware mitigation, vulnerability scanning, usage based billing, computer forensics and incident response, and asset management.

Malware mitigation can be manual or automatic. For manual mitigation, the threat mitigation team, for example the Help Desk, customer care desk, or CERT desk, determines that a device with a given IP address is attacking other devices or giving other symptoms of malware infection. Using the MAC-IP-Owner database with the IP address as the key, the malware mitigation team determines the owner or physical switch port associated with the IP address of the offending device. The malware mitigation team can notify the owner, or they manually disconnect the device. In automatic malware mitigation, the system consults the owner or the physical address of the switch port, and either notifies the owner or disconnects the device.

For vulnerability scanning, the vulnerability scan team, using an owner and/or a MAC address consults the MAC-IP-Owner database, and obtains the associated IP address. The device scan is performed using this IP address.

For usage based billing, the usage based billing team observes the flows in a network and construct s a usage profile keyed to IP address. Using the IP address as the key to the MAC-IP-Owner database, owners are mapped to usage profiles. These individual profiles aggregate and a charge applied to the usage and owner for billing.

Using the method and system of our invention, for computer forensics and incident response, the Threat Mitigation Team determines that a device with a given IP address is attacking other devices or giving symptoms of system intrusion. The Threat Mitigation Team uses the MAC-IP-Owner database, with the IP address as the key, to obtain the offending device, owner, or switch port associated with the IP address of the offending device. This is sued for mitigation, such as notifying the owner, disconnecting, blocking reconnection, or locating the device physically for investigation.

In the case of asset management, the method and system of the invention maintains the current location of the device. This is done using the MAC-IP-Owner database with the owner as key, obtain the port (that is the wall switch port or the Ethernet wall port). This information is updated by a requirement that the user login with port information, MAC, and user address.

It is to be noted that if the ID presented by the Protocol 802.1X supplicant can be used as the method of owner identification. This information alone can be used, and the IP address can be associated to the device.

Alternatively, as shown in FIG. 8, the ID presented by the 802.1X supplicant is used as the owner identification 811, and the IP address is not addressed, but obtained from the Dynamic or Static Address management systems with a key of IP address 821 to a MAC/IP/Owner database 831.

The invention may be implemented, for example, by having the system for registering and recording access data and authorizations in a network as software or as a program product. This is accomplished by executing the method as a software application, in a dedicated processor, or in a dedicated processor with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for securing and accessing digital data as a software application.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. Thus, the instructions may be stored on a computer readable, tangible storage media, which precludes signals and carrier waves, such as an optical data storage disc (e.g., a CD-ROM). As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A method of capturing connection information for a supplicant client coupled to an internal network, wherein said internal network comprises a connection information server that is coupled to an authentication switch, and wherein said authentication switch couples a supplicant client to an authentication server, said method comprising:

the authentication switch prompting the connection information server to register the authentication switch to receive updated connection information;

the authentication switch challenging the supplicant client for the supplicant client's identity;

the authentication switch receiving the supplicant client's response to the challenge and transmitting the supplicant client's response to the authentication server;

the authentication switch receiving a response from the authentication server indicating whether the supplicant client is authorized to access said internal network, wherein if the supplicant client is authorized the authentication switch:

relays the authentication result to the supplicant client, and sends the supplicant client's ID and connection information to the connection information server; and the authentication switch transmitting, to an authentication database at the connection information server, the supplicant client's ID and updated connection information based on the registration of the authentication switch, wherein the authentication database is located within the internal network whose access is controlled by the authentication switch and the authentication server, wherein the authentication database is merged with connection information from other databases to create associations between client ID's, networked devices owned by the supplicant client, and at least one of a physical location of the networked devices, MAC addresses of the networked devices, and dynamic IP addresses of the networked devices, and wherein a manager of the internal network is enabled to utilize information in the authentication database and the associations to protect resources within the internal network.

2. The method of claim 1 wherein if the supplicant client is authorized, the authenticator switch captures the supplicant's ID and IP address, and transfers the supplicant client's ID and IP address to the authentication database.

3. The method of claim 1 wherein the authentication database receives further information comprising the supplicant client's MAC address, a switch port number, a switch ID, and an authentication server ID.

4. The method of claim 1, wherein the authentication database further comprises port status, port speed, and packets per second for packets passing through the authentication switch to the internal network.

5. The method of claim 1, further comprising:

in response to a port on the authentication switch being subsequently closed such that the supplicant client is no longer able to access the internal network, clearing all entries in the authentication database.

6. The method of claim 1, further comprising:

in response to detecting malware in the supplicant client, directing the manager to utilize stored information in the authentication database to disconnect and block reconnection of the supplicant client to selected resources in the internal network.

7. The method of claim 1, further comprising:

the authentication switch transmitting, to the authentication database, changes in switch status for storage of said changes in a connection database.

8. The method of claim 7, further comprising utilizing stored changes in the authentication database to perform malware mitigation, vulnerability scanning, usage based billing, forensics, and asset management for the supplicant client.

9. A connection information server comprising:

a central processing unit (CPU), a computer readable memory, and a computer readable storage media;

first program instructions to register an authentication switch to receive updated connection information and to send a response to the authentication switch, wherein said authentication switch is adapted to challenge a supplicant for the supplicant's identity, wherein said authentication switch is further adapted to receive the supplicant's response to the challenge and to transmit said supplicant's response to an authentication server, and wherein said response to said authentication switch acknowledges a receipt of said supplicant's response to said authentication server;

second program instructions to, in response to the supplicant being authorized to connect to a network that is monitored by using the connection information server, instruct said authentication switch to:

relay the authentication result to the supplicant, and send the supplicant's ID and connection information to the connection information server on a remote site;

third program instructions to receive, store, and process supplicant connection information, wherein said supplicant connection information comprises the supplicant's connection information; and fourth program instructions to protect resources within the network based on information in an authentication database, wherein the authentication database is merged with connection information from other databases to create associations between client ID's, networked devices owned by a supplicant client, and at least one of a physical location of the networked devices, MAC addresses of the networked devices, and dynamic IP addresses of the networked devices, and wherein the authentication database is located within an internal network whose access is controlled by the authentication switch and the authentication server, and wherein said first, second, third, and fourth program instructions are stored on said computer readable storage media for execution by said CPU via said computer readable memory.

10. The connection information server of claim 9, wherein if the supplicant is authorized, the authenticator switch is further adapted to capture the supplicant's ID and IP address, and to transfer the supplicant's ID and IP address to a connection database that is associated with said network.

11. The connection information server of claim 10, wherein the connection database associated with the network is further adapted to receive information comprising the supplicant's MAC address, a switch's port number, a switch ID, and an authentication server ID.

12. The connection information server of claim 11, wherein the connection database further comprises ordered pairs of MAC addresses and associated owner identification.

13. The connection information server of claim 12, wherein the connection database is further adapted to receive MAC addresses and owner identification through a browser.

14. The connection information server of claim 12, further comprising means for mining an associated database to recover ordered pairs of MAC addresses and owner identification.

15. The connection information server of claim 9, further adapted to capture changes in switch status and to collect said changes in the connection database.

16. A computer program product to monitor access to an internal network, said computer program product comprising:

a computer readable, tangible storage media;

first program instructions for an authentication server to register an authentication switch to received updated connection information and to receive a supplicant's response from the authentication switch, wherein the supplicant's response is received in response to a challenge from the authentication switch to the supplicant for the supplicant's identity;

second program instructions for the authentication server to send a server response to the authentication switch; wherein if the supplicant is authorized the authentication switch:

relays the authentication result to the supplicant, and sends the supplicant's ID and connection information to a connection information server on the remote site, and wherein the authentication switch transmits, to an authentication database at the connection information server on the remote site, the supplicant client's ID and connection information, wherein the authentication database is located within the internal network whose access is controlled by the authentication switch and the authentication server, wherein the authentication database is merged with connection information from other databases to create associations between client ID's, networked devices owned by a supplicant client, and at least one of a physical location of networked devices, MAC addresses of the networked devices, and dynamic IP addresses of the networked devices, and wherein a manager of the internal network is enabled to utilize information in the authentication database and the associations to protect resources within the internal network; and wherein said first and second program instructions are stored on said computer readable tangible storage media.

17. The computer program product of claim 16, further comprising:

third program instructions to, in response to the supplicant being authorized to access the internal network, cause the authenticator switch to capture the supplicant's ID and IP address, and transfer the supplicant's ID and IP address to a connection database.

18. The computer program product of claim 17, further comprising:

fourth program instructions to cause the connection database associated with the system to receive further information comprising the supplicant's MAC address, a switch's port number, a switch ID, and an authentication server ID.

19. The computer program product of claim 18, wherein the connection database contains ordered pairs of MAC addresses and associated owner identification.

20. The computer program product of claim 19, further comprising:

fifth program instructions to receive MAC addresses and owner identification through one of (1) a browser, and (2) data mining.

* * * * *